(12) United States Patent
Amon et al.

(10) Patent No.: US 7,119,969 B1
(45) Date of Patent: Oct. 10, 2006

(54) PIXEL MATCHED CAMERA OPTICS

(75) Inventors: Max Amon, Maitland, FL (US);
Richard LeBlanc, Orlando, FL (US);
George A. Bradley, Winter Park, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 261 days.

(21) Appl. No.: 10/855,014

(22) Filed: May 27, 2004

(51) Int. Cl.
| | |
|---|---|
| G02B 13/00 | (2006.01) |
| G02B 27/14 | (2006.01) |
| G02B 27/12 | (2006.01) |
| G02B 13/14 | (2006.01) |
| G02B 27/10 | (2006.01) |

(52) U.S. Cl. ............ 359/722; 359/355; 359/618; 359/634; 359/637

(58) Field of Classification Search ........ 359/363–366, 359/618, 629, 630–637, 350–361, 721–723, 359/399, 676, 722
See application file for complete search history.

(56) References Cited

U.S. PATENT DOCUMENTS

| | | | | |
|---|---|---|---|---|
| 4,659,171 A | * | 4/1987 | Neil | 359/354 |
| 4,691,999 A | | 9/1987 | Wheeler | 359/859 |
| 4,804,258 A | | 2/1989 | Kebo | 359/36.6 |
| 5,078,502 A | | 1/1992 | Cook | 359/36.6 |
| 5,159,489 A | * | 10/1992 | Massie et al. | 359/419 |
| 5,161,051 A | * | 11/1992 | Whitney et al. | 359/351 |
| 5,477,395 A | | 12/1995 | Cook | 359/861 |
| 5,729,376 A | | 3/1998 | Hall et al. | 359/36.6 |
| 5,936,771 A | * | 8/1999 | Cooper | 359/618 |
| 6,178,047 B1 | * | 1/2001 | Cook | 359/634 |
| 6,870,690 B1 | * | 3/2005 | Lawson et al. | 359/722 |

* cited by examiner

*Primary Examiner*—Thong Q Nguyen
(74) *Attorney, Agent, or Firm*—Jeffrey D. Myers; Timothy D. Stanley; Peacock Myers, P.C.

(57) ABSTRACT

An optical system and method comprising acquiring radiation in a plurality of spectral bands, each acquired by a discrete collector, receiving the acquired radiation in one or more of the spectral bands with one or more afocal zoom optics, each receiving radiation from a different collector, and aligning each point of fields of view of the collectors to a fraction of a pixel.

20 Claims, 1 Drawing Sheet

PIXEL MATCHED CAMERA OPTICS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for common alignment of pixels from two or more different optical systems.

2. Description of Related Art

The spectral characteristics and signatures of natural and/or manmade objects vary. These differences may be employed in sensory instruments, where the discrimination of targets from background clutter is enhanced by the difference in spectral characteristics. In order to develop the algorithms needed to exploit these differences, a means is needed to create imagery in two or more spectral bands where each point of the field of view of two or more separate cameras align to a fraction of a pixel. Many systems have been design to generate imagery in two or more spectral bands, but none have successfully matched two separate optical systems to such accuracy. The field of view, focal length and distortion must be custom matched to meet this extremely difficult specification. Diffraction limited performance is also required from each camera optic.

Accordingly, critical alignment of each pixel of two optical systems operating in two or more spectral bands presents a difficult design challenge. Even extremely tight fabrication tolerances cause sufficient variation in the pixel alignment to defeat the purpose of simultaneous two color data collection and two-color algorithm development.

The present invention overcomes this difficulty by incorporating an afocal zoom optic located in front of one of the optical systems. The midwave and longwave optics preferably have substantially identical fields of view and substantially zero distortion so that each point in object space matches at the corresponding image point in the focal plane. Fabrication tolerances upset this delicate balance but adjusting the afocal zoom lens can readily make compensation for these variations.

Prior practices include the following. One approach is to use a single optic that is color corrected over the whole spectral band and a single detector sensitive to both spectral ranges. This approach, however, limits the types of detectors that can be used and the spectral ranges that can be imaged simultaneously.

A rotating filter wheel might be employed that alternates the image spectrum thereby achieving the pixel registration. However, the time delay between frames can lead to erroneous results if there is motion in the FOV. This approach requires a single focal plane array that therefore limits the spectral range that may be used to the sensitivity range of the detector.

Two separate lens systems have been used side by side to accomplish the same task as the invention. However, when the optics are arranged side by side the system suffers from parallax. Even when the apertures are combined with a dichroic the system is not pixel aligned because of dissimilar distortion characteristics between the two optical systems. Even when zoom optics are employed there are significant differences so that pixel match is not achieved.

Still another technique has been to employ four micro lenses directly in front of the detector array. Each lens is designed for a specific wavelength and has a spectral filter installed or deposited on the lens. The lenses are located in the cooler dewar and must be cooled along with the focal plane array. Each lens uses ¼ of the array. Since the lenses are so close together the parallax is insignificant, but the tolerances on the alignment and components are prohibitive. Since a single array is used, there are limits on the wavebands that can be covered simultaneously.

Also of note are U.S. Pat. No. 5,729,376, entitled "Catadioptric Multi-Functional Optical Assemby", to Hall et al.; U.S. Pat. No. 5,477,395, entitled "Two Nested All-Reflective Afocal Telescopes Providing Four Fields of View", to Cook; U.S. Pat. No. 5,078,502, entitled "Compact Afocal Reimaging and Image Derotation Device", to Cook; U.S. Pat. No. 4,804,258, entitled "Four Mirror Afocal Wide Field of View Optical System", to Kebo; and U.S. Pat. No. 4,691,999, entitled "Afocal Beam Expansion Apparatus and Method", to Wheeler.

The present invention is simple and components may be fabricated to readily achievable tolerances. The data may be taken in all spectral bands simultaneously.

BRIEF SUMMARY OF THE INVENTION

The present invention is of an optical system and method comprising: acquiring radiation in a plurality of spectral bands, each acquired by a discrete collector; receiving the acquired radiation in one or more of the spectral bands with one or more afocal zoom optics, each receiving radiation from a different collector; and aligning each point of fields of view of the collectors to a fraction of a pixel. In the preferred embodiment, exactly one of the collectors does not have a corresponding afocal zoom optic, the plurality of collectors comprises a means for acquiring midwave infrared and a means for acquiring longwave infrared, the plurality of collectors each has a substantially identical field of view, and the plurality of collectors each has substantially zero distortion. The radiation is preferably combined after passing through the zoom optics, more preferably via beamsplitter, and most preferably via dichroic beamsplitter. An afocal (preferably reflective) then receives the radiation passed through the dichroic beamsplitter.

Objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawing, which is incorporated into and forms a part of the specification, illustrates one or more embodiments of the present invention and, together with the description, serves to explain the principles of the invention. The drawing is only for the purpose of illustrating one or more preferred embodiments of the invention and is not to be construed as limiting the invention. In the drawing.

DETAILED DESCRIPTION OF THE INVENTION

Figure 1:
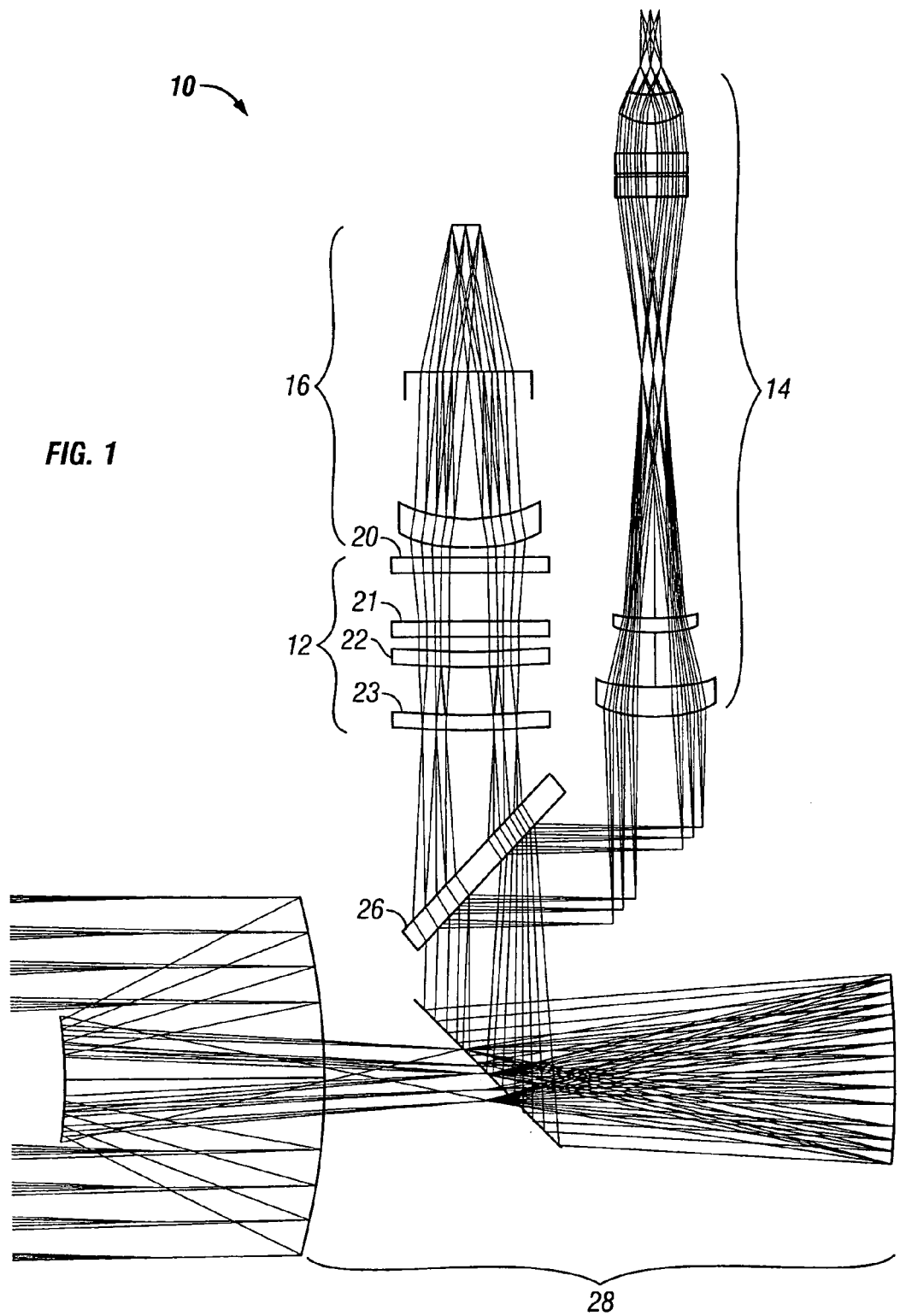
FIG. 1 is a schematic diagram of an illustrative embodiment of the invention.

The present invention is of an optical system 10 and method that permits pixel matching in two or more spectral bands by incorporating an afocal zoom optic 12 located in front of one or more of the optical subsystems (more generally, radiation collectors) 14, 16 for such bands. Referring to FIG. 1, which illustrates the invention with two spectral bands, the midwave and longwave optics 14, 16 of that embodiment preferably have substantially identical fields of view and substantially zero distortion so that each point in object space matches at the corresponding image point in the focal plane. Fabrication tolerances upset this delicate balance but adjusting the afocal zoom lens 12 can readily make compensation for these variations.

The current state of the art of infrared equipment typically operates either in the midwave infrared (IR) (3 to 5 micron spectral range) or in the longwave IR (8 to 12 micron spectral range). Each spectral range has distinct advantages. The midwave system operates better on foggy days while the longwave system can see better through obscurants such as smoke and smog. The issue of countermeasures is also a factor where if one spectral band is attacked the operator may switch to the other. However, simultaneous dual band operation can highlight targets for an operator or automatic target recognizer by providing enhanced target signatures or two color highlights. This enhanced operation better discriminates targets from background clutter.

Table 1 summarizes the optical characteristics of the midwave and longwave systems of the exemplary embodiment.

TABLE 1

|  | Midwave system | Longwave system |
| --- | --- | --- |
| Spectral Range | 3.5 to 4.8 microns | 8 to 12 microns |
| Array Size | 256 × 256 | 320 × 240 |
| Pixel Size | 30 × 30 microns<br>60 × 60 effective | 46.25 × 46.25 |
| Format Size | 7.68 × 7.68 mm | 14.8 × 11 mm |
| Common FOV | 2.26 × 2.26 deg | 2.26 × 2.26 deg |
| Independent FOV | 2.26 × 2.26 deg | 5.65 × 4.24 deg |
| EFL | 7.65" | 6.00" +/− 200% |
| f/number | 2.6 | 1.5 |
| Aperture Size | 3.0" | 4.0" |

FIG. 1 shows a layout of the critically aligned optical system of the invention. The afocal zoom comprises four lens elements 20,21,22,23 and is incorporated as part of the long wave lens system. The afocal zoom permits the adjustment of two air spaces so that the afocal magnification can be changed (thereby changing the focal length of the long wave system) and simultaneously maintaining system focus. Both midwave and long wave optics were designed to be free of distortion. The apertures are combined at the dichroic beamsplitter 26 (or other means for combining the received radiation) eliminating any paralax between systems. A reflective 3× afocal 28 is preferably also employed so that the system has both a narrow and wide Field-of-View (FOV). The afocal is preferably all reflective so that it does not introduce any chromatic effects, and any other abberations introduced by the afocal yield the same effect in both the mid and longwave paths.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optical system comprising:
   a plurality radiation collectors, each operating in a different spectral band;
   one or more afocal zoom optics, each receiving radiation from one of said collectors; and
   means for combining the radiation from said plurality of collectors after passing through said zoom optics; and
   wherein each point of fields of view of the collectors align to a fraction of a pixel.

2. The optical system of claim 1 wherein exactly one of said collectors does not have a corresponding afocal zoom optic.

3. The optical system of claim 1 wherein said plurality of collectors comprises a collector of midwave infrared and a collector of longwave infrared.

4. The optical system of claim 1 wherein said plurality of collectors each has a substantially identical field of view.

5. The optical system of claim 4 wherein said plurality of collectors each has substantially zero distortion.

6. The optical system of claim 1 wherein said means for combining comprises a beamsplitter.

7. The optical system of claim 6 wherein said beamsplitter is a dichroic beamsplitter.

8. The optical system of claim 7 additionally comprising an afocal system for receiving the radiation passed through said dichroic beamsplitter.

9. The optical system of claim 8 wherein said afocal system is a reflective afocal system.

10. An optical method comprising the steps of:
    acquiring radiation in a plurality of spectral bands, each acquired by a discrete collector;
    receiving the acquired radiation in one or more of the spectral bands with one or more afocal zoom optics, each receiving radiation from a different collector;
    combining the radiation from the plurality of collectors after passing through the zoom optics; and
    aligning each point of fields of view of the collectors to a fraction of a pixel.

11. The optical method of claim 10 wherein exactly one of the collectors does not have a corresponding afocal zoom optic.

12. The optical method of claim 10 wherein the plurality of collectors comprises a means for acquiring midwave infrared and a means for acquiring longwave infrared.

13. The optical method of claim 10 wherein the plurality of collectors each has a substantially identical field of view.

14. The optical method of claim 13 wherein the plurality of collectors each has substantially zero distortion.

15. The optical method of claim 10 wherein the combining step comprises employing a beamsplitter.

16. The optical method of claim 15 wherein the beamsplitter is a dichroic beamsplitter.

17. The optical method of claim 16 additionally comprising employing an afocal system for receiving the radiation passed through the dichroic beamsplitter.

18. The optical method of claim 17 wherein the said afocal system is a reflective afocal system.

19. An optical system comprising:
- a plurality radiation collectors, each operating in a different spectral band; and
- one or more afocal zoom optics, each receiving radiation from one of said collectors; and wherein each point of fields of view of the collectors align to a fraction of a pixel and exactly one of said collectors does not have a corresponding afocal zoom optic.

20. An optical method comprising the steps of:
- acquiring radiation in a plurality of spectral bands, each acquired by a discrete collector;
- receiving the acquired radiation in one or more of the spectral bands with one or more afocal zoom optics, each receiving radiation from a different collector; and
- aligning each point of fields of view of the collectors to a fraction of a pixel; and wherein exactly one of the collectors does not have a corresponding afocal zoom optic.

\* \* \* \* \*